Figure 3:
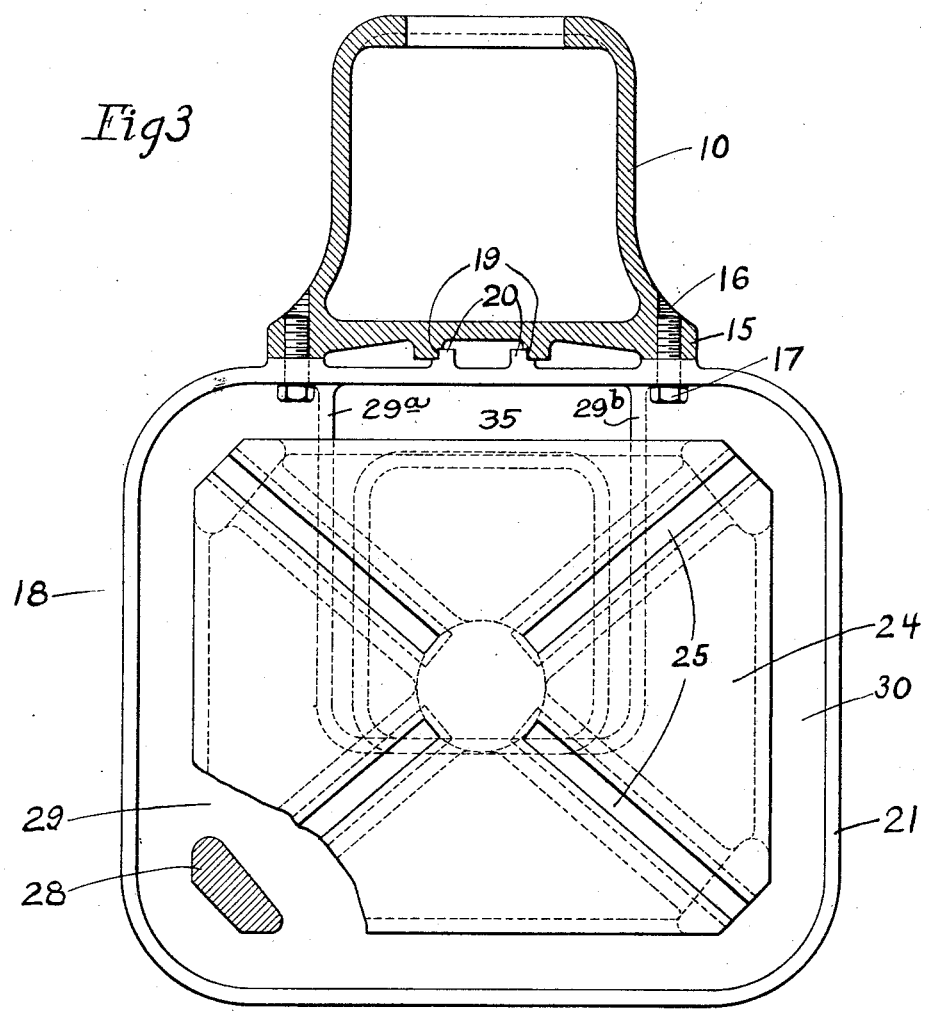

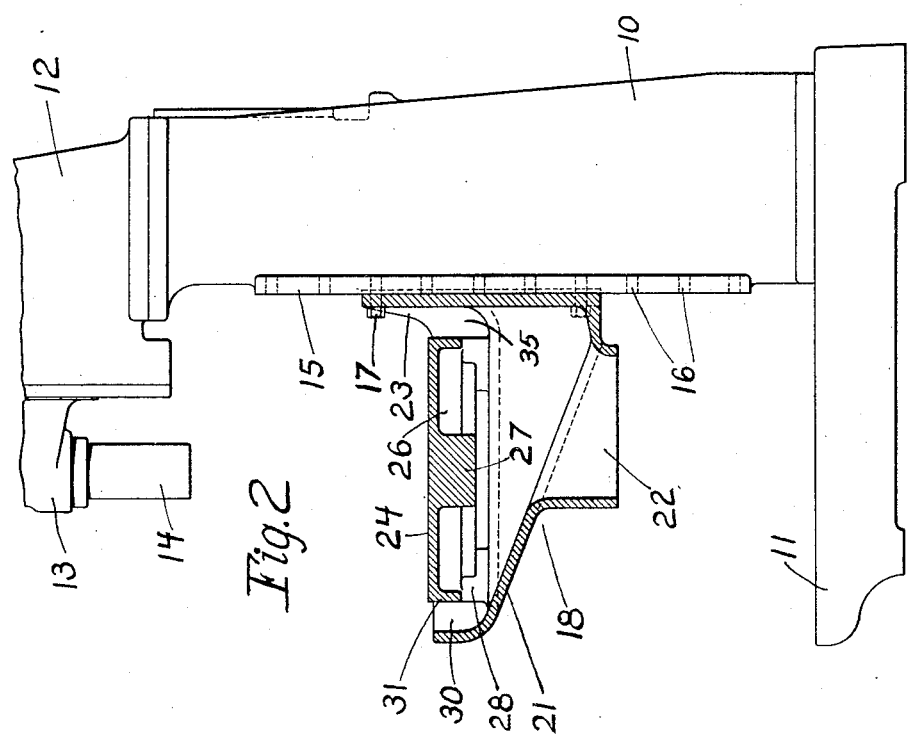
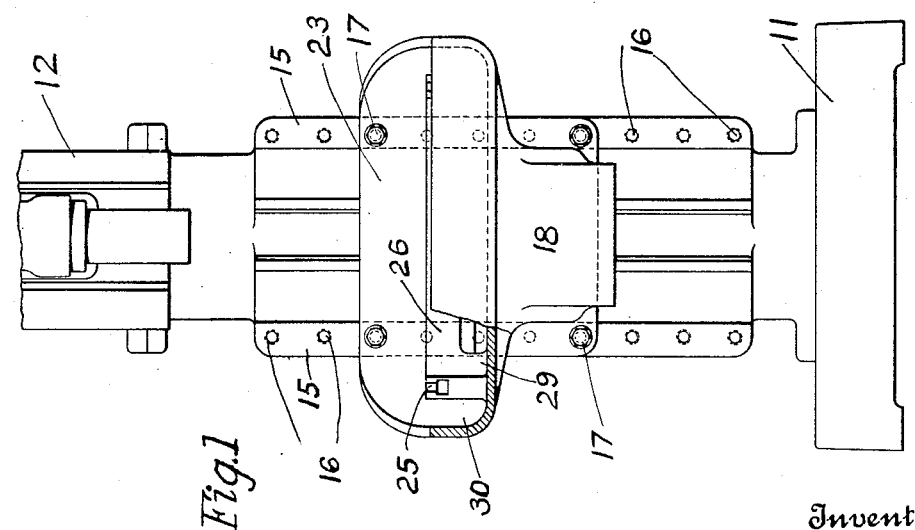

Aug. 9, 1932.   D. C. KLAUSMEYER   1,870,413
WORKTABLE AND MOUNT THEREFOR
Filed Sept. 4, 1929   2 Sheets-Sheet 2

Inventor
David C. Klausmeyer
By Attorneys
Nathan & Bowman

Patented Aug. 9, 1932

1,870,413

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

WORKTABLE AND MOUNT THEREFOR

Application filed September 4, 1929. Serial No. 390,253.

This invention is directed to improvements in machine tool work tables and mounts therefor having features of advantage of somewhat general application but particularly in drilling machines of the upright or similar type.

The problem of chip and lubricant disposal is one of serious consequence in machines of this type wherein a generous supply of the latter is normally required and the chips are often long and difficult of disposal and inclined to sweep around spreading themselves and throwing lubricant over a wide area. This is particularly disagreeable owing to the fact that the operations most commonly performed on such machines are such as to require close or frequent attendance by the operator.

Applicant has provided a table which permits the easy disposal of chips and lubricant and the maintenance of a clean environment for the operator free from the soaking lubricant and sharp dangerous chips.

Various designs of tables have been resorted to in an attempt to satisfactorily meet this problem and tables in which the lubricant drains down therethrough have long been used and are of most common construction. Attempts also have been made to pass the work chips down through the table but for the most part with very limited success and in general such constructions have served only to carry away the smaller chips and have required so much time and work on the part of the operator as to be impractical and as a rule it was found in the end more expedient to sweep them off in the usual manner. A factor which made the problems involved even more difficult was that of the necessity of providing a table rigid and strong within itself and further having a support on the machine such as to suffer no distortion from the extremely high forces often imposed thereon. This latter factor was usually met by employing an auxiliary leg or support immediately under the table but which occupied the area which could otherwise be employed as a discharge point and a temporary receptacle for the work chips.

In accordance with this invention a table has been provided of such construction as to present well positioned passages and ample openings for the chips to pass freely down through the table along with the lubricant either solely under their own gravitation or with but a small amount of urging by the operator. The passages include and terminate in a large discharge opening of ample proportions centrally located in the bottom of the table where they may be held and caused to accumulate.

The general organization includes a means for supporting the table of such construction as to permit of the elimination of the under support of the table and thereby of the use of a deep table having a large under discharge opening, without sacrificing any of the rigidity or adjustability normally required of such work tables. The general features of this construction include widely spaced vertically extending bearing surfaces with a vertical guideway arranged midway between them; and complemental surfaces on the table which commensurate with the depth of the table are relatively long in vertical extent. The vertical guideway and widely spaced long bearing surfaces provide ample supporting means for the bending moments imposed thereon.

As a part of the above organization a securing means co-operating therewith and of particular advantage therein is provided comprising a set of widely spaced screw bolt holes in the table and bearing surfaces on the column with a series of such sets whereby the table may be securely bolted in exact selected vertical positions. The definite locations of the holes and the central guideways insure that the table may be quickly and easily secured in the desired vertical position and with the assurance that the table will not be canted. The position and alignment of machined openings or surfaces are dependent upon the table being exactly perpendicular to the vertical axis of the machine column and spindle and the above features assuring accuracy in such respect are of prime importance.

Further objects of the invention reside in specific features of construction which result in a well appearing solid work supporting structure.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a front view of the lower portion of an upright drill with the invention incorporated therein; Fig. 2 is a side view thereof with the table shown in vertical section; and Fig. 3 is a horizontal view, cross sectional through the drill column, showing the table in plan view.

The drawings disclose an upright drill, conventional as to its general features which include a vertical column 10 supported on a base 11 and having an upper part 12 carrying a spindle head 13 slidable in ways thereon. The present machine is shown as having a single spindle 14 carried in the head 13.

The forward face of the column is provided with the flanges 15 through which are formed a series of vertically spaced threaded openings 16 adapted to receive the bolts 17 for securing the work table 18 on the column. Midway between the flanges 15 are located the vertically extending square shouldered guideway surfaces 19. The table 18 has projecting therefrom ribs 20 presenting notched bearing surfaces complemental to the square shouldered surfaces on the column.

The holes 16 in the column are properly located to afford a plurality of sets of openings complemental to the set of openings in the work table whereby the table may be selectively mounted in any one of many definite predetermined positions in accordance with the particular requirements. The holes are carefully located and the middle guideways are likewise accurately machined and located such that the table may be easily and quickly secured in the desired position and with the assurance that the table will not be inclined to the vertical axis of the tool spindle.

The table itself is very deep in its proportions and permits the bolt holes therethrough to be widely spaced and thereby more advantageously located as to accessibility and particularly in a more effective position to resist the bending moments imposed on the table. All the bearing surfaces are of unusually large extent for this type of machine and are so spaced as to provide a very rigid and reliable support for the table and one in which table under legs can be dispensed with.

The work table itself consists of a deep smoothly contoured casting having an outer casing 21 somewhat funnel-shaped in general with a large opening 22 in the bottom thereof. The rear of the casting has an upwardly extending flange portion 23 adapted to provide a strong backing for supporting the table on the column and a long lever arm for resisting turning moments about the resulting fulcrum near the bottom of the contacting surfaces between the table and column.

The interior of the casting is cored out to provide large openings leading to the common discharge opening 22 but having substantial interconnecting web and rib members well capable of supporting the planed work supporting surface 24. The work surface has the conventional T-slots 25 therein. The under structure for the platform 24 includes four ribs 26 arranged in the form of a cross radiating from the central boss 27. The outer ends of the ribs have a downwardly extending portion 28 merging into the bottom wall 29 of the table. The upper outer rim of the casting is spaced from the table a distance to provide a trough 30 extending around the table of sufficient width to permit chips to readily fall therein. The outer edge of the platform 24 is re-inforced by a flange 31 extending between the ribs 26.

It may be seen that the coring leaves large openings between the ribs 26, bounded on the top and bottom by the ribs 31 and the bottom wall 29 respectively. These openings all extend downwardly and merge into the common large discharge opening 22. The bottom wall is in general inclined at a relatively sharp angle as shown in Figs. 1 and 2 and the chips will practically gravitate of their own weight out the discharge opening 22 or at least will require the application of but little effort and time on the part of the operator to maintain the passages free. All the corners are well rounded to aid in such freedom of passage.

The bottom wall 29 of the table is not continuous about the platform 24. Rearwardly of the platform and substantially in line with the opening 22, the bottom wall is discontinued as at $29^a$—$29^b$ thus forming a well 35 into which the chips, accumulated upon the platform, may be brushed, or pushed by the placing of the next succeeding work-piece on the platform. The chips deposited into the well fall substantially vertically through the opening 22.

The chips are discharged on to the base 11 the latter being provided if desired with a large removable sheet metal casing extending adjacent to or toward the upper surface of the table. The base 11 is formed to provide a reservoir for the lubricant draining from the table and work chips in a well known manner.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. An upright drilling machine combining a column; and a work table adapted to be secured on one side thereof; said column having at its forward face spaced vertically extending bearing surfaces with series of vertically spaced apertures therein and said table having complemental bearing surfaces with a set of apertures therein the apertures in said column being arranged in a series of vertically spaced sets each complemental to the set of apertures in said table whereby the table may be bolted to said column in selected vertical positions vertically arranged guide surfaces provided by said column intermediate said bearing surfaces; vertically arranged bearing surfaces formed on said table and engaging said guide surfaces to locate said table on said column and facilitate adjustment of the former, and said table being further provided with an upper centrally located work supporting surface, and a plurality of openings leading from adjacent the edge of said table to a common large discharge opening in the lower part of said table, the lower walls of said plurality of openings being sharply inclined to permit the free gravitation of work chips.

2. An upright drilling machine combining a column and a work-table adapted to be secured thereto, said column having at its forward face spaced vertically extending bearing surfaces and said table having complemental bearing surfaces adapted to be secured thereto; means for securing said table to said column in various positions of adjustment with the bearing surfaces thereof in contact with the bearing surfaces of said column; vertically arranged guide surfaces provided by said column intermediate said bearing surfaces; vertically arranged bearing surfaces formed on said table and engaging said guide surfaces to locate said table on said column and to facilitate adjustment of the former; said table being also provided with a work supporting surface and a plurality of openings leading from adjacent the edge of said table to a common large discharge opening in the lower part of said table, the lower walls of said plurality of openings being sharply inclined to permit free gravitation of work chips, said table being further provided, rearwardly of the work supporting surface and adjacent the rear edge thereof, with a vertically arranged well above said discharge opening to permit chips brushed from said work supporting surface to fall into said well and through said discharge opening.

In witness whereof, I have hereunto subscribed my name.

DAVID C. KLAUSMEYER.